United States Patent [19]

Mizushina et al.

[11] Patent Number: 4,984,988

[45] Date of Patent: Jan. 15, 1991

[54] SIMULATED ENGINE CHARACTERISTIC CONTROL SYSTEM

[75] Inventors: Fumio Mizushina; Takashi Goto; Toshimitsu Maruki, all of Shizuoka, Japan

[73] Assignee: Kabushiki Kaisha Meidensha, Tokyo, Japan

[21] Appl. No.: 436,298

[22] Filed: Nov. 13, 1989

[51] Int. Cl.$^5$ ............................................. G09B 25/00
[52] U.S. Cl. ..................................... 434/380; 434/365; 434/373; 364/578; 73/865.6; 74/866; 123/419
[58] Field of Search ................ 434/224, 305, 365, 367, 434/373, 379, 380, 389, 401; 73/118.1, 865.6, 865.9; 364/431.01, 431.02, 431.03, 578; 318/432, 433, 434; 74/866; 123/419, 436

[56] References Cited

U.S. PATENT DOCUMENTS

| | | | |
|---|---|---|---|
| 4,680,959 | 7/1987 | Henry et al. | 73/865.6 X |
| 4,763,264 | 8/1988 | Okuno et al. | 123/436 X |
| 4,889,015 | 12/1989 | Kondo | 74/866 |
| 4,919,098 | 4/1990 | Shimada et al. | 123/419 X |

Primary Examiner—Richard J. Apley
Assistant Examiner—Joe H. Cheng
Attorney, Agent, or Firm—Bachman & LaPointe

[57] ABSTRACT

An simulated engine characteristic control system for transmission transient performance tests for automotive vehicles comprises a motor for driving an input shaft of the tested transmission, a pick-up for detecting revolution of the motor, a simulating circuit for simulating an opening angle of the throttle of the engine to be associated with the tested transmission or the intake manifold pressure of the engine, an engine characteristic generator for generating a torque command signal according to predetermined engine revolution/torque characteristic curves, in response to the signals from the pick-up and the simulating circuit, a torque/current transducer for transducing the torque command signal to an analog current command signal according to a predetermined torque/current characteristic, and means for compensating the current command signal in consideration of a torque component occurring at an axial moment of inertia of the rotating member of the motor during acceleration or deceleration of the motor, and a field characteristic of a field coil of the motor, representing the output torque/revolution of the motor. The motor is drivingly controlled in response to a current command signal compensated through the compensating means.

8 Claims, 2 Drawing Sheets

FIG.1 *(PRIOR ART)*

SIMULATED ENGINE CHARACTERISTIC CONTROL SYSTEM

BACKGROUND OF THE INVENTION

1. Field of the Invention

The present invention relates to an simulated engine characteristic control system for power train performance tests for automotive vehicles, particularly to a system utilized for transient performance tests for automotive transmissions, for example an endurance test for synchronizing devices used in manual transmissions, wherein a test is made to simulate stress applied to the synchronizing devices when shifting during high acceleration or quick deceleration, and a feeling test for automatic transmissions, wherein a test is made to determine whether or not shifting is smoothly executed during simulated acceleration and/or deceleration. Specifically to a system in which transient performance tests for transmissions can be simulated by replacing the internal combustion engine associated with a transmission to be tested with a direct-current (DC) motor serving as a driving device.

2. Description of the Prior Art

Conventionally, there have been proposed and developed various transient performance test machines for automotive vehicles. In transmission performance tests, the engine associated with the transmission being tested is in general utilized as a driving device for the tested transmission. In this situation, many ancillary facilities are necessitated to operate the engine, thereby resulting in a relatively large test space. Furthermore, the horsepower generated from the engine may vary slightly due to changes in the ambient temperature during the performance test. For this reason, it was desirable that the engine drive method be replaced with a motor drive method. As is generally known, since an axial moment of inertia of the rotor employed in the motor is much greater than that of the rotating member of the engine, such as an engine crankshaft and a flywheel, such motor drive devices cannot sufficiently simulate changes in engine speed due to the low responsiveness of such devices when compared to an engine. Therefore, recently, there has been proposed and developed a transmission transient performance test machine including a relatively low inertia motor drive device which can generate output revolutions and output torques similar to an engine which operates in combination with a speed-increasing gear so as to have an axial moment of inertia similar to the rotating member of an engine. This low inertia of the rotor of the DC motor is accomplished by a highly rigid rotating shaft and a cooling device being capable of efficiently cooling the motor. One such conventional transmission transient performance test machine is shown in FIG. 1. Referring now to FIG. 1, the input shaft of a tested transmission 1 is connected through a torquemeter 8 to a low inertia DC motor 2 including a speed-increasing gear, while the output shaft of the transmission 1 is connected to a dynamometer 3 serving as a load applied to the transmission 1. Reference numeral 4 denotes an engine characteristic generator which generates a torque command signal T* in accordance with an engine revolution/torque characteristic map being comprised of a plurality of engine revolution/torque characteristic curves depending on the respective opening angle of the throttle valve of the engine. The map is assumed and preset in the engine characteristic generator 4, on the basis of the characteristics associated with the engine normally coupled with the tested transmission. The engine characteristic generator 4 is connected to a throttle opening angle signal generator (not shown) or an intake manifold pressure signal generator (not shown) and generates a torque command signal to a torque controller 7, in response to either a throttle opening angle signal $\theta$ from the above mentioned throttle opening angle signal generator or an intake manifold pressure signal from the above mentioned intake manifold pressure signal generator. The engine characteristic generator 4 also receives an actual revolution signal N through a pulse pick-up 5, disposed in the vicinity of the rotating shaft of the DC motor 2 for detecting actual revolution of the DC motor 2, and a frequency/voltage transducer 6, processing pulses from the pulse pick-up 5 to a voltage signal indicative of the actual rpm of the DC motor 2. For instance, when the engine characteristic generator 4 receives the signal $\theta_i$ indicative of a throttle opening angle of 100%, the generator 4 generates the torque command signal T* determined according to the actual revolution N of the DC motor 2, plotted on the uppermost curve shown in FIG. 1, indicating the engine revolution/torque relationship at a full throttle state. Conversely, when the engine characteristic generator 4 receives the signal $\theta_o$ indicative of a throttle opening angle of 0%, the generator 4 outputs the torque command signal T* determined according to the actual revolution N, plotted on the lowermost curve shown in FIG. 1, indicating the revolution/torque relationship at a fully closed throttle valve state. In the engine characteristic generator 4 as shown in FIG. 1, although the two engine revolution/torque curves are indicated between the uppermost and lowermost curves, more engine revolution/torque curves may be stored in the generator 4, depending on throttle opening angles of the engine. For instance, ten engine revolution/torque curves may be selected according to step-by-step throttle opening angles. The torque controller 7 compares the torque command signal T* from the engine characteristic generator 4 and the detected output torque signal T from the previously described torquemeter 8, and thereafter controls the DC motor 2 in such a manner as to reach the detected output torque T to the torque command signal T*. In other words, the input torque applied to the tested transmission 1 is adjusted by the feedback control on the basis of the torque output from the DC motor 2. In this manner, in conventional transmission transient performance test machines, the torquemeter detects the actual output torque T from the DC motor and thereafter the detected torque T is controlled in a manner so as to reach the command torque T* by feedback control, thereby permitting high accuracy of the output torque T. However, the responsiveness of conventional test machines is relatively low, for example 1 to 3 sec due to delay of the feedback control with regard to the output torque from the DC motor. Such conventional test machines may not satisfactorily respond to the previously described transmission transient performance tests.

In order to improve the responsiveness of the torque control, there has been proposed and developed another type transmission transient performance test machine wherein output torque from a DC motor for driving a tested transmission is derived from an actual current or voltage applied to the DC motor. In this case, since the output torque from the DC motor is not determined by a torque signal from a torquemeter disposed in the output side of the DC motor but by a current or voltage applied to the input side of the DC motor, the responsiveness of the test machine is improved. However, when comparing the previously described two conventional transmission transient performance test machines, the latter is inferior to the former with regard to the accuracy of the output torque control of the DC motor.

SUMMARY OF THE INVENTION

It is, therefore, in view of the above disadvantages, an object of the present invention to provide an simulated engine characteristic control system having high responsiveness and high accuracy, serving for power train transient performance tests, such as transmission transient performance tests, for automotive vehicles.

In order to accomplish the aforementioned and other objects, an simulated engine characteristic control system comprises; a motor for driving an input shaft of a power train for an automotive vehicle, means for monitoring revolution of the motor, the monitoring means generating a signal indicative of the revolution of the motor, means for simulating an opening angle of a throttle valve of an engine or an intake manifold pressure of an engine, the simulating means generating a signal indicative of the opening angle or the intake manifold pressure, an engine characteristic generator for generating a torque command signal according to predetermined engine revolution/torque characteristic curves memorized therein, in response to signals from both the monitoring means and the simulating means.

The simulation control system also includes; means for transducing the torque command signal to an electric current command signal according to a predetermined torque/current characteristic curve of the motor memorized therein, first compensating means for compensating the current command signal by a compensatory current signal corresponding to a torque component occurring at an axial moment of inertia of the rotating member of the motor during acceleration or deceleration of the motor, second compensating means for compensating the current command signal according to a field characteristic of a field coil of the motor, the field characteristic exhibiting an output torque/revolution relationship with the motor. The motor is drivingly controlled in response to a current command signal compensated through both the compensating means. The simulation control system further comprises means for controlling an electric current input into the motor by feedback control, in response to the current command signal compensated through the compensating means. Preferably, the motor may comprise a direct current motor. The motor may be combined with a speed-increasing gear. The monitoring means includes a pulse pick-up disposed in the vicinity of the rotating shaft of the motor. The torque/current characteristic curve memorized in the transducing means is predetermined by the input current applied from the controlling means to the motor and an actual output torque generated from the motor when applying its input current to the motor. The actual output torque is detected by a torquemeter connected to the output shaft of the motor. The first compensating means may include means for generating an angular acceleration signal on the basis of the revolution signal from the monitoring means, means for generating a signal indicative of the axial moment of inertia of the rotating member, means for calculating the torque component on the basis of the angular acceleration signal and the axial moment of inertia signal, the calculating means generating the compensatory current signal corresponding to the torque component, and an adder-subtracter for adding the compensatory current signal to the current command signal or subtracting the compensatory current signal from the current command signal, during acceleration or deceleration of the motor. The second compensating means may include means for generating a compensatory coefficient signal according to the field characteristic, in response to the revolution signal, and a divider for dividing the current command signal compensated through the first compensating means by the compensatory coefficient signal.

DESCRIPTION OF THE PREFERRED EMBODIMENT

Figure 2:
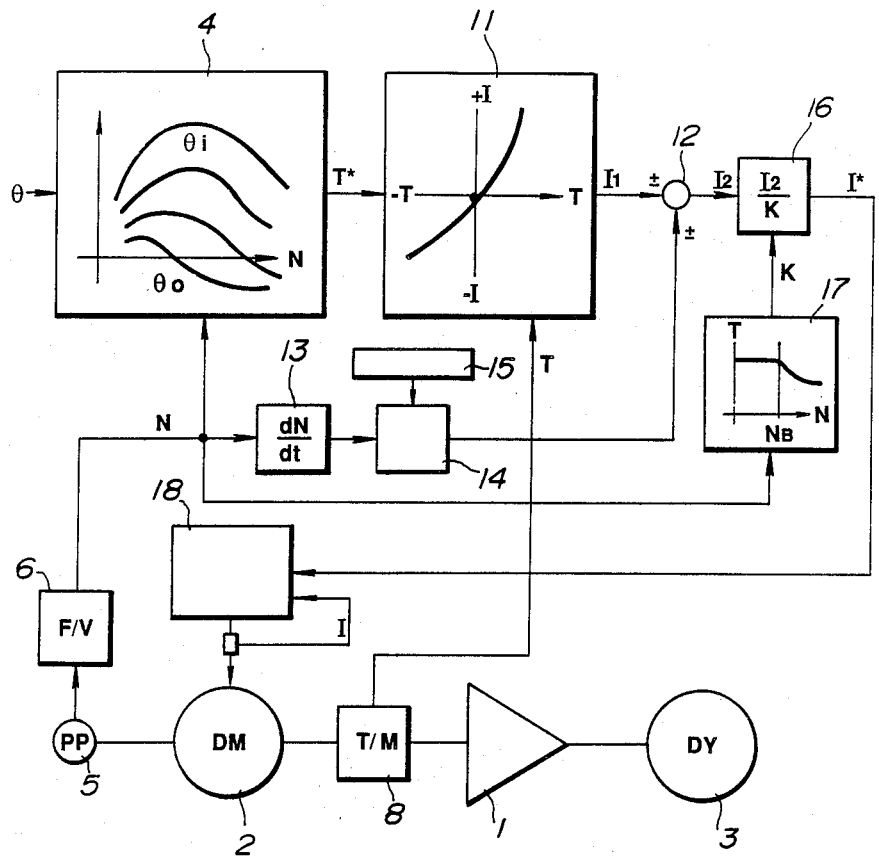
FIG. 2 is a system diagram illustrating the main components of a transmission transient performance test machine including a simulated engine characteristic control system according to the invention.

The principles of the present invention, applied to an simulated engine characteristic control system for power train transient performance tests for automotive vehicles, are illustrated in FIG. 2.

Figure 1:
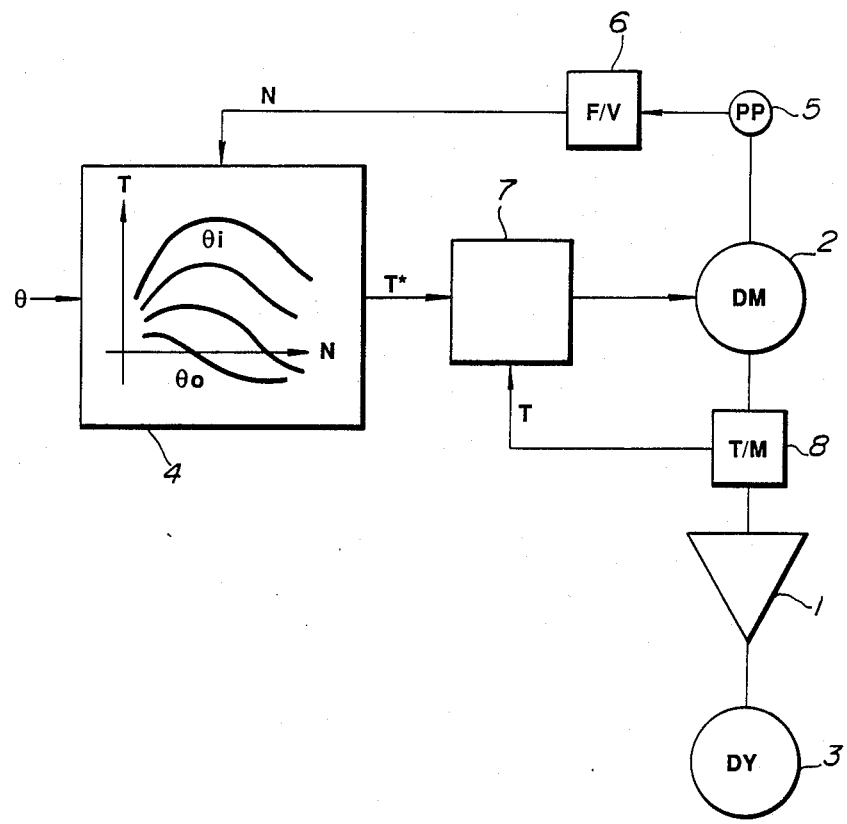
FIG. 1 is a system diagram illustrating the main components of a conventional transmission transient performance test machine.

In the preferred embodiment, the same reference numerals used to designate elements in the conventional transmission transient performance test machine as shown in FIG. 1 will be applied to corresponding elements used in the embodiment according to the invention for the purpose of comparing the conventional system and the improved system.

Referring now to FIG. 2, the engine characteristic generator 4 outputs a torque command signal $T^*$ to a torque/current transducer 11, in response to the throttle opening angle signal $\theta$ as previously described in the prior art disclosure, and then the torque command signal is processed into an electric current command signal $I_1$ in accordance with a torque/current characteristic curve of the DC motor 2. Note that the torque/current characteristic curve is predetermined by two parameters, namely a current I applied to the input side of the DC motor and an output torque T from the DC motor 2, detected by the torquemeter 8 disposed between the DC motor 2 and the input shaft of the tested transmission 1 finally connected to the dynamometer 3. Since the above mentioned torque/current characteristics of the DC motor gradually vary depending on various factors, such as changes in ambient temperature or deterioration of the field coil of the DC motor, preferably the torque/current relationship is calibrated just before the transmission transient performance tests are executed, so as to permit high accuracy of the output torque control of the DC motor. After calibration, the data is stored in the transducer 11 as a renewed torque/current characteristic curve. During testing, the torque command signal $T^*$ may be quickly converted into the current command signal $I_1$ according to the torque/current characteristic curve stored in the transducer 11. Furthermore, the current command signal $I_1$ is compensated through two compensation processes and thereafter the compensated current command signal $I^*$ is output into an electric current controller 18. One current compensation process is an adding/subtracting process executed by an adder-subtracter 12, wherein, during simulated acceleration or deceleration, a compensatory current signal corresponding to a torque component required to accelerate or decelerate the rotating member of the DC motor due to an axial moment of inertia thereof is added to the command signal $I_1$ or subtracted from the command signal $I_1$. As clearly seen in FIG. 2, the compensatory current signal is generated according to the following order.

First, the pulse pick-up 5 which is disposed in the vicinity of the rotating shaft of the DC motor 2, outputs a pulse signal representative of the output revolution of the DC motor 2 to the frequency/voltage transducer 6. The transducer 6 processes the pulse signals into an analog signal N representative of the actual output revolution of the DC motor 2. The revolution signal N from the transducer 6 is output into the engine characteristic generator 4 and is also output into a differentiator 13. The differentiator 13 processes an angular speed derived from the revolution signal N into an angular acceleration signal dN/dt representative of an angular acceleration of the rotating member of the DC motor. Thereafter, the angular acceleration signal dN/dt is output from the differentiator 13 to an arithmetic logical unit 14. The unit 14 multiplies the angular acceleration signal dN/dt by an axial moment of inertia of the rotating member of the DC motor 2, derived from an inertia setting circuit 15 and thus calculate the torque component required to accelerate or decelerate the rotating member. Finally, the unit 14 converts the calculated torque component into the compensatory current value and outputs the compensatory current signal to the adder-subtracter 12.

The current command signal $I_1$ compensated by the adder-subtracter 12 is output into a divider 16 as a compensated current command signal $I_2$. The other current compensation process is a dividing process executed by the divider 16, wherein the compensated current command signal $I_2$ is divided by a coefficient K depending on a field characteristic of the field coil of the DC motor 2. As seen in FIG. 2, the coefficient K is determined by a field characteristic curve stored in a field characteristic generator 17. The field characteristic generator 17 receives the revolution signal N from the transducer 6 and thereafter outputs a signal indicative of the coefficient K to the divider 16 in accordance with the field characteristic curve exhibiting the output torque/revolution relationship of the DC motor such that, when the output revolution N is less than a base speed $N_B$, the output torque T is substantially constant, while as the output revolution N exceeds the base speed $N_B$, the output torque T is exponentially lowered according to increase in the revolution N. As set forth, after final compensation of the current signal $I_2$ at the divider 16, the divider 16 outputs a final current command signal $I^*$ into an electric controller 18. The electric controller 18 detects the output current I of the DC motor 2 and operates the DC motor 2 in such a manner as to reach the output current I by feedback control.

As will be appreciated from the above, the torque control of the tested transmission 1 is accomplished by current control of the DC motor 2 as previously described. Therefore, the engine characteristic simulation control system according to the invention, can provide a high responsiveness of torque control from the DC motor, substantially 0.02 to 0.03 sec. This is experimentally assured by the inventors of the invention. Moreover, since the torque/current characteristic data, stored in the transducer 11 generating the initial current command signal $I_1$, is easily, reliably calibrated and renewed, and thereafter the initial current command signal $I_1$ is compensated through the previously described two current compensation processes, such current control permits high accuracy torque control of the DC motor 2 in spite of the current control.

Although in the preferred embodiment, the DC motor is used for the simulated engine characteristic control system, another type motor may be used therefor.

While the foregoing is a description of the preferred embodiment for carrying out the invention, it will be understood that the invention is not limited to the particular embodiment shown and described herein, but may include variations and modifications without departing from the scope or spirit of this invention as described by the following claims.

What is claimed is:

1. A simulated engine characteristic control system for power train performance tests of an automotive vehicle comprising:
    a motor simulated engine of an automotive vehicle having a rotating member for driving an input shaft of a power train for said automotive vehicle;
    means for monitoring revolution of said motor, said monitoring means generating a signal indicative of the revolution of said motor;
    means for simulating an opening angle of a throttle valve of an engine or an intake manifold pressure of an engine, said simulating means generating a signal indicative of an opening angle or an intake manifold pressure;
    an engine characteristic generator for generating a torque command signal according to predetermined engine revolution and torque characteristic curves memorized therein, in response to the signals from both said monitoring means and said simulating means;
    means for transducing said torque command signal to an electric current command signal according to a predetermined torque and current characteristic curve of said motor memorized therein;
    first compensating means for compensating said current command signal by a compensatory current signal corresponding to a torque component occurring at an axial moment of inertia of the rotating member of said motor during acceleration and deceleration of said motor;
    second compensating means for compensating a first compensated current command signal from said first compensating means according to a field characteristic of a field coil of said motor, said field characteristic representing the output torque and revolution speed of said motor; and
    means for controlling said motor in response to a final compensated current command signal from said second compensating means.

2. The simulation control system as set forth in claim 1, wherein said means for controlling said motor is a feedback control for controlling an electric current input to said motor in response to the final compensated current command signal compensated through said first and second compensating means.

3. The simulation control system as set forth in claim 1, wherein said motor comprises a direct current motor.

4. The simulation control system as set forth in claim 1, wherein said motor is combined with a speed-increasing gear.

5. The simulation control system as set forth in claim 1, wherein said monitoring means includes a pulse pick-up disposed in the vicinity of the rotating member of said motor.

6. The simulation control system as set forth in claim 2, wherein said torque and current characteristic curve memorized in said transducing means is predetermined by the input current applied from said controlling means to said motor and an actual output torque detected by a torquemeter connected to the rotating member of said motor.

7. The simulation control system as set forth in claim 1, wherein said first compensating means includes means for generating an angular acceleration signal on the basis of said revolution signal from said monitoring means, means for generating a signal indicative of said axial moment of inertia of the rotating member, means for calculating said torque component on the basis of the angular acceleration signal and the axial moment of inertia signal, said calculating means generating the compensatory current signal corresponding to said torque component, and an adder-subtracter for adding the compensatory current signal to said current command during acceleration of said motor and subtracting the compensatory current signal from said current command signal during deceleration of said motor.

8. The simulation control system as set forth in claim 1, wherein said second compensating means includes means for generating a compensatory coefficient signal according to said field characteristic, in response to said revolution signal, and a divider for dividing the first current command signal compensated through said first compensating means by said compensatory coefficient signal.

* * * * *